May 21, 1968 R. SOLLICH 3,384,003
APPARATUS FOR TEMPERING CHOCOLATE AND SIMILAR
FATTY MASSES, PARTICULARLY FOR CHOCOLATE
COATING INSTALLATIONS
Filed April 20, 1964
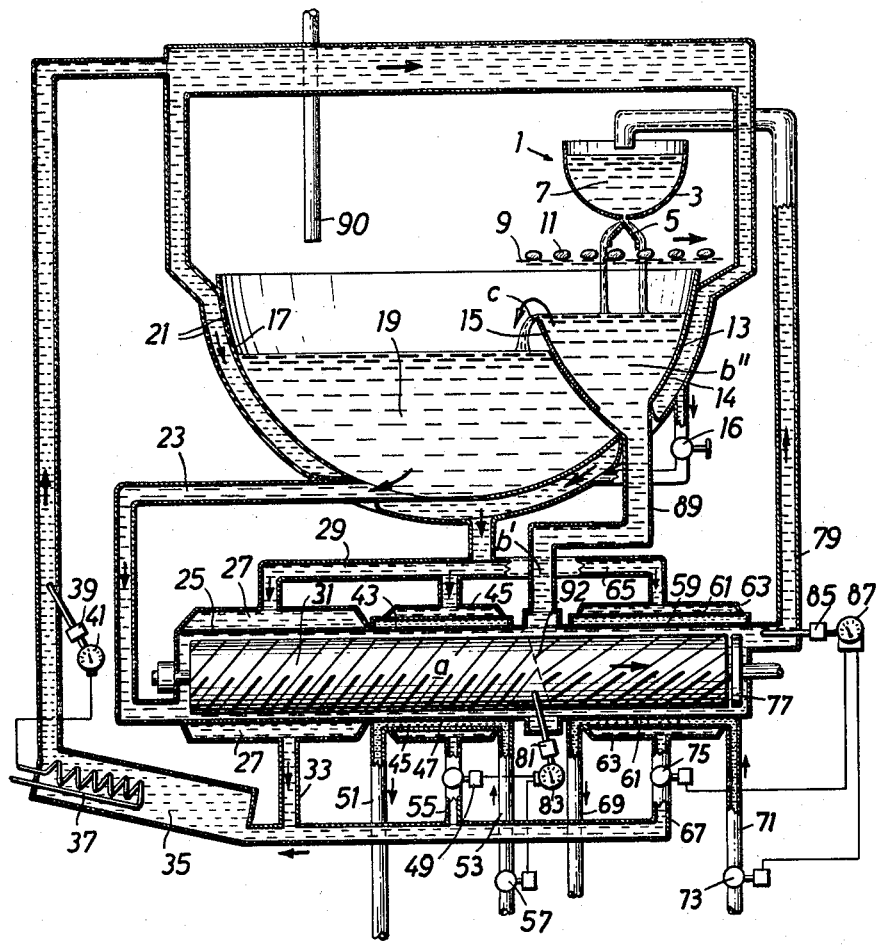

United States Patent Office 3,384,003
Patented May 21, 1968

3,384,003
APPARATUS FOR TEMPERING CHOCOLATE AND SIMILAR FATTY MASSES, PARTICULARLY FOR CHOCOLATE COATING INSTALLATIONS
Robert Sollich, Auf der Breden 12,
Bad Salzuflen, Germany
Filed Apr. 20, 1964, Ser. No. 360,943
3 Claims. (Cl. 99—236)

ABSTRACT OF THE DISCLOSURE

Apparatus for tempering a mass having the characteristics of chocolate wherein this mass is applied in excess quantities to the point of application, the excess portion being introduced into a collecting vessel having an adjustable wall permitting some of the excess to flow into a storage container. Material is fed from the storage container by means of a screw successively along a heating cylinder, a tempering cylinder and an after-heating and mixing cylinder. Material is fed from the collecting vessel to a point between the tempering cylinder and after-heating and mixing cylinder where it is combined with material from the storage cylinder and fed at an accelerated rate along the after-heating and mixing cylinder to the point of application. Controlled heating and cooling means are provided to regulate the temperature of the mass throughout its flow path.

---

This invention relates to a process and apparatus for tempering chocolate and similar fatty masses to be used in chocolate coating installations.

It is an object of the invention to provide a process and apparatus in which a mass, for example a chocolate mass may be maintained in the best possible tempering state at an ideal degree of germination. The tempering state and the degree of germination of a chocolate mass for example, which is to be used in a coating installation, are essential for the quality and conservation of the product.

Several processes are already known through which a constantly tempered chocolate mass may be obtained for application in coating installations. The drip-feed process for example employs a continuously working tempering machine which feeds hourly only so much tempered cholocolate mass to the storage container of a coating installation as is actually consumed in the coating operation. But it has been found that the newly supplied chocolate mass is not able to retard the rapid crystal growth in the storage container of the coating installation and consequently a slow condensation of the coating mass will occur. This is particularly noticeable during rest periods or other work interruptions during which the drip-feeder must be idle as otherwise the storage container for the coating installation would overflow. The temperature of the chocolate mass and its viscosity is therefore not constant in this process so that a coating produced with this known process is of inferior quality and poor conservation properties.

A process has also become known which is to be used particularly in coating installations and in which selected quantities of tempered chocolate mass and selected quantities of untempered chocolate mass are mixed together and tempered again before the entire mass is fed to the application device.

This prior art process thus provides a constantly freshly tempered mass at the consuming station which is not equally suitable for working different types of chocolate masses in an equally effective manner, because in this process the temperature of the chocolate mass at the end of the tempering cylinder is equal to the working temperature in the application device. But as indicated, a further cooling or a slight reheating of the chocolate mass after this tempering cylinder is required depending on the chocolate mass treated, in order that the most favorable germination and best possible crystal form may be obtained, which would give the finished product a constant sheen.

All prior art processes were directed to a more or less intensive temperature influence of the mass. But it has now been found that the residence time is just as important a factor in influencing the quality and conservation property of the treated mass. By "residence time" is understood the period of time during which the chocolate mass is in the tempered state and thus makes possible an increase and growth of the solidification crystals in the mass.

It is therefore an object of the present invention to avoid the above-mentioned disadvantages of the prior art processes and to consider at the same time the above defined "residence time" of the chocolate mass.

This object is obtained with the process according to this invention in that freshly tempered and strongly undercooled chocolate mass is continuously mixed with a partial amount of older tempered mass which is kept in storage. This partial amount of older tempered chocolate mass may be regulated and is a mass which has germinated more strongly, and the two masses are brought together to a temperature which is favorable for further working.

The partial amount of older tempered mass is taken preferably from a collection vessel for the chocolate mass not consumed at the application device.

The "residence time" of the chocolate mass not used at the application device is controllable in that the capacity of the collection vessel may be adjusted.

The amount of mass which is continuously freshly tempered is larger than the amount which is consumed at the application device, and the excess obtained in the collection vessel flows from this vessel into a storage tank, in which the mass is heated to a temperature at which fat crystals are no longer present in the chocolate mass.

The apparatus for carrying out the process according to the invention and which is coupled to the application device comprises a container for receiving the mass not used at the application device and a tempering cylinder. The collection vessel has an overflow whose upper edge may be adjusted in height, and a storage tank is connected to the overflow structure. This storage tank has a double wall so that a heating medium may be circulated between the walls. A heating cylinder is connected to the storage tank for heating the chocolate mass arriving from the storage tank and a tempering cylinder is connected in series after the heating cylinder, while a heating and mixing cylinder is connected in series behind the tempering cylinder, and a conduit leads from this cylinder to the delivery container of the application device. The conduit for feeding the chocolate mass from the collection vessel which receives the mass not used in the coating stage introduces the mass into the transition point between the tempering and after-heating cylinder.

The heating jacket of the heating cylinder is connected preferably in series behind the heating jacket of the storage tank so that the heating medium flows in succession through both heating jackets.

The heating jacket of the tempering cylinder and the heating jacket of the after-heating cylinder are connected preferably in parallel to each other and to the heating jacket of the heating cylinder and connected in series after the heating jacket of the storage tank.

In the conduits, which supply the heating jackets of the tempering and of the after-heating cylinder with heating medium, valves are arranged, and these valves are actuated by contact thermometers which respond to the temperature of the mass being worked.

Around the tempering and after-heating cylinder a cooling jacket is arranged and in the coolant feeding lines leading to these cooling jackets, valves are arranged which are actuated by contact thermometers which respond to the temperature of the mass.

In a preferred embodiment the heating cylinder, the tempering cylinder and the after-heating cylinder are arranged one after the other as a continuous cylinder and a worm screw is mounted in the three cylinders.

For space reasons the heating cylinder, the tempering cylinder and the after-heating cylinder may be mounted separately from each other and be connected by conduits feeding the chocolate mass from one to the other.

The pitch of the worm screw of the after-heating cylinder is greater than the pitch of the worm screw in the heating and tempering cylinder, preferably twice as high.

Further details of the advantages of the invention will be understood more clearly from the following description in combination with the accompanying drawing in which an embodiment of the apparatus according to the invention is illustrated in the single figure.

In the drawing the delivery machine is indicated generally by numeral 1 and represents a coating machine. In this connection it should be clearly understood that the invention is not limited to applications with coating machines but may be used in other apparatus for tempering chocolate or candy masses and the like. The coating machine consists essentially of a delivery container 3 in the bottom side of which openings are provided through which the chocolate is discharged in the form of sheets.

Sheet-guiding members 5 serve to direct the sheets of chocolate over the pieces to be coated. The chocolate mass 7 contained in receptacle 3 is in a tempered state. Below receptacle 3 a wire mesh conveyor band 9 is arranged which is moving in the direction of the arrow and the pieces 11 to be coated are disposed on this wire mesh screen. The pieces are moved on the conveyor band 9 under the sheets of chocolate and are coated with the chocolate. The chocolate not retained on the pieces as coating flows through the conveyor band 9 into the collector vessel 13 in which the chocolate $b''$ which has not been used is collected.

The collector vessel 13 has a double wall 14 through which a heating medium is circulated, and the flow of the heating medium through the double wall 14, which is within the general heating medium circuit or loop of the apparatus to be described in greater detail hereafter, may be regulated by means of a valve 16 in the same manner as the heat output is controlled in a common radiator of a central heating installation, in other words the volume of the heating medium circulating between the walls 14 per unit of time may be regulated by means of valve 16.

The vessel 13 has an overflow 15 whose height may be adjusted so that the overflow edge may be set higher or lower as desired. The height adjustable overflow is illustrated only diagrammatically in the drawing. By adjusting the height of the overflow edge the volume of the chocolate mass $b''$, not used up may be stored in the collecting vessel 13, may be selectively regulated.

The overflow 15 leads to a storage container 17 in which the non-tempered chocolate mass 19 is received. A conduit 90 connected to a supply tank (not shown) extends into the storage tank 17 and supplies new chocolate mass in the amount required for use in the delivery machine to provide the chocolate coatings. The storage tank 17 is provided with a double wall 21, and between the two walls of the storage tank 17 a heating medium, for example hot water is circulated. The water flows through the jacket of the storage tank 17 in a circuit or loop and a heating chamber 35 is provided in this loop and a heating coil 37 is mounted in this heating chamber for heating the water. A contact thermometer 39, 41 extends into the heating loop close to the heating coil and downstream thereof. This contact thermometer may be set a predetermined temperature and thus controls the temperature of the heating medium constantly and controls the heating coil 37 to cycle on and off depending on the temperature of the heating medium. The contact thermometer 39, 41 is so set that the temperature of the heating medium is approximately 45° C.

A conduit 23 for the chocolate mass leads from the storage tank 17 to a heating cylinder 25 in which a conveyor screw 31 is mounted rotatably. The heating cylinder 25 is surrounded by a heating jacket 27 which is connected by pipes 29 and 33 into the heating medium loop of the storage tank 17. By means of the conveyor screw 31 the chocolate mass is moved along the surfaces of the heating jacket 27 in a narrow angular gap whereby it is made certain that the chocolate mass is melted completely under the effect of the heating medium contained in the heating jacket 27, so that no fat crystals are contained in the chocolate mass. A tempering cylinder 43 is connected to the heating cylinder 25 and is surrounded by a heating jacket 45. The heating jacket 45 is connected by pipe 55 parallel to the heating jacket 27 of the heating cylinder 25, and is connected in series with the heating medium loop of the storage tank 17. The valve 49 is mounted in pipe 55 and will be discussed in greater detail hereafter.

Between the heating jacket 45 and the tempering cylinder 43, a cooling jacket 47 is disposed to which a cooling medium is supplied through pipes 51 and 53. A valve 57 is mounted in conduit 53 for controlling the supply of coolant.

The tempering cylinder 43 is arranged coaxially of the conveyor screw 31 and downstream in the direction of movement of the chocolate from heating cylinder 25. The conveyor screw 31 thus also traverses the tempering cylinder 43. It will be understood that the spatial arrangement of the heating and tempering cylinders 25 and 43 may be different from that disclosed herein; for example both cylinders could also be arranged adjacent each other and be interconnected for the feeding of the chocolate mass by appropriate conduits.

The chocolate mass $a$ which arrives from a heating cylinder 25 at a temperature of about 40° C. is cooled down to about 1 to 2° C. below the final working temperature in the coating machine 1 in order to provide a more favorable heating of the chocolate mass.

The output of the heating cylinder 25 and of the tempering cylinder 43 is so designed that it is greater than the volume of the mass used up at the delivery point 1 for the coating operation.

A contact thermometer 81, 83 is arranged at the end of the tempering cylinder 43. The contact thermometer 81, 83 may be selectively set to a pre-determined mass temperature desired at the end of the tempering cylinder, and regulates the operation of valves 49 and 57. In case the temperature of the mass at the end of the tempering cylinder is too low, valve 57 is closed and valve 49 is opened while in the case of excessively high temperature of the mass at the end of the tempering cylinder valve 49 is closed and valve 57 is opened.

In case the tempering cylinder 43 is to be heated at the end of the working operation or during a work pause the temperature set at the contact thermometer 81, 83 is increased in a corresponding manner so that valve 49 for the supply of heating medium is opened and valve 57 for the supply of coolant is closed.

The after-heating and mixing cylinder 59 is connected after the tempering cylinder 43. In the embodiment illustrated in the drawing the after-heating cylinder is mounted axially of the cylinders 25 and 43, and is also traversed by the screw conveyor 31, but the latter has a greater pitch in the after-heating cylinder 59 and therefore a greater feeding output than the screw conveyor portions of the heating cylinder 25 and of the tempering cylinder 43. The output of the screw conveyor portion of the after-heating cylinder 59 is preferably twice as high as the output of the screw conveyor portions in cylinders 25 and 43. The line 92 indicates the separation line between the different pitch of the two portions of the screw conveyor. It will be understood that the after-heating cylinder 59 may also be spaced from the two cylinders 25 and 43, for example may be mounted adjacent the latter instead of axially thereof and be connected to the tempering cylinder 43 by suitable conduits for feeding the chocolate mass.

The after-heating and mixing cylinder 59 is surrounded, like the tempering cylinder, with a heating jacket 63 and a cooling jacket 61. The conduits 65 and 67 of the heating jacket 63 are connected in parallel with the heating loop of the storage container 17 and in parallel with the heating jackets 27 and 45 of the preceding cylinders 25 and 43. In pipe 67 of the heating loop a valve 75 is provided. The cooling jacket 61 is fed with coolant through pipes 69 and 71 and a valve 73 is mounted in pipe 71.

A contact thermometer 85, 87 is connected into the outlet of the after-heating and mixing cylinder 59 and the temperature of this thermometer may be adjusted selectively. The contact thermometer 85, 87 controls the supply of the heating and cooling medium to the after-heating and mixing cylinder 59 by means of a corresponding actuation of the valves 73 and 75. In this arrangement it is also possible to heat the after-heating or mixing cylinder 59 by a correspondingly higher setting of the contact thermometer 85, 87 after the close of the working operation or during a pause, in that the supply of coolant through valve 75 is closed and the supply of heating medium is increased by opening valve 75. As soon as the coating machine and thus the tempering conveyor screw are disconnected, the heating process begins automatically. In other words the coolant valves 57, 73 are closed and the heating medium valves 49, 75 are opened.

At the end of the after-heating and mixing cylinder 59 a pump 77 is arranged which pumps the chocolate mass through a conduit 79 to the delivery container 3 of the coating machine 11.

From the collector vessel 13, in which the chocolate mass $b''$ not used in the coating machine is collected, a conduit 89 leads to the transition point between the tempering cylinder 43 and the after-heating and mixing cylinder 59. Through this conduit 89 an adjustable volume $b'$ of the non-used chocolate mass $b''$ is continuously introduced into the transition point between the tempering cylinder 43 and the after-heating and mixing cylinder 59.

In the drawing the direction of flow of the heating medium as well as of the coolant and of the chocolate stream is indicated by arrows.

The manner of operation of the apparatus illustrated in the drawing may be derived already from the above description of the apparatus and is essentially as follows:

A chocolate mass flowing from the delivery container 3 and not retained as coating on the pieces or articles 11 flows through the wire mesh conveyor band 9 and is collected in the collector vessel 13. To give a ratio of the amount which does not adhere to the articles to be coated, the chocolate mass not retained on the articles is normally about 80% to 90% of the volume of the mass fed by pump 77 through conduit 79.

A predetermined portion $b'$ of this mass $b''$ not used flows continuously through conduit 89 to the transition point between the tempering cylinder 43 and the after-heating and mixing cylinder 59. The amount of non-used chocolate mass which does not flow through conduit 89 pours over the overflow 15 into the storage tank 17. The residence time of the non-used volume $b''$ in collector vessel 13 is adjustable by regulating the overflow 15. If the overflow 15 is relatively high the vessel 13 has a relatively large capacity and the residence time is relatively long. When the overflow 15 is set low the residence time is shortened in a corresponding manner.

The chocolate mass $c$ pouring over the overflow 15 is heated in the storage tank 17 and flows together with the chocolate mass 19 already contained in the storage tank 17 together with the chocolate mass newly supplied through conduit 90 through the conduit 23 to the heating cylinder 25 where it is heated to about 40° C. From the heating cylinder 25 the chocolate mass $a$ is conducted into the tempering cylinder 43 in which it is undercooled in the manner described above by about 1 to 2° C. This freshly tempered, undercooled chocolate mass is combined at the end of the tempering cylinder 43 with continuous partial amounts $b'$ of the tempered mass $b''$ which is introduced through conduit 89 and which is maintained at the working temperature. The partial mass $b'$ contains, depending on the residence time set in vessel 13, a corresponding quantity of germs or crystals.

The amounts $a$ and $b'$ are intimately mixed together in the subsequent after-heating or mixing cylinder 59, and depending on the setting of the contact thermometer 85, 87, are cooled down further or are slightly heated. This depends on the type of coating mass being applied. A dark cover is worked, as is known, at a temperature which is 1 or 2° higher than a milk chocolate coating, and a milk chocolate coating to which softer auxiliary fatty substances are added requires a strong cooling in the tempering cylinder 43 and a subsequent reheating in the mixing cylinder 59 to a temperature which lies above the melting point of the unstable beta crystals. The strong undercooling in the tempering cylinder 43 is required in order to form in the continuous working process sufficient amounts of solidification germs in the cocoa butter.

The chocolate mass thus brought to the proper temperature in the after-heating or mixing cylinder 59 is fed by pump 77 through conduit 79 to the application station 11.

What is claimed is:

1. Apparatus for tempering a mass having the characteristics of chocolate comprising in combination
    means for applying the tempered mass,
    collector means for receiving the unused tempered mass from said applying means,
    storage means for receiving a portion of the tempered mass from said collector means,
    heating means for said collector means and said storage means,
    a heating cylinder connected to said storage means, a cooling cylinder connected to said heating cylinder, and a mixing and reheating cylinder connected to said cooling cylinder,
    heating means for said cylinders,
    cooling means for said cooling cylinder and said mixing and reheating cylinder,
    conduit means for feeding tempered mass from said storage means to said heating cylinder,
    screw conveyor means in said cylinders for feeding tempered mass through said cylinders,
    conduit means for feeding tempered mass from said collector means to said screw conveyor means between said cooling cylinder and said mixing and reheating cylinder,
    and pump means mounted at the end of said mixing and reheating cylinder for feeding the mass to said application means, said apparatus including a heating jacket having spaced double walls enclosing said storage means and said cylinders,
    first pipe means for feeding a heating fluid from said heating jacket of said storage means to said heating jackets of said cylinders,
    second pipe means for feeding the heating fluid from said heating jackets of said cylinders to said heating jacket of said storage means,
    heating means in said second pipe means for heating said fluid,
    and fluid temperature sensing means extending into said second pipe means downstream of said heating means and connected thereto for controlling the temperature of said heating fluid.

2. Apparatus for tempering a mass having the characteristics of chocolate comprising in combination
means for applying the tempered mass,
collector means for receiving the unused tempered mass from said applying means,
storage means for receiving a portion of the tempered mass from said collector means,
heating means for said collector means and said storage means,
a heating cylinder connected to said storage means, a cooling cylinder connected to said heating cylinder, and a mixing and reheating cylinder connected to said cooling cylinder,
heating means for said cylinders,
cooling means for said cooling cylinder and said mixing and reheating cylinder,
conduit means for feeding tempered mass from said storage means to said heating cylinder,
screw conveyor means in said cylinders for feeding tempered mass through said cylinders,
conduit means for feeding tempered mass from said collector means to said screw conveyor means between said cooling cylinder and said mixing and reheating cylinder,
pump means mounted at the end of said mixing and reheating cylinder for feeding the mass to said application means, the side walls of said collecting means being adjustable in height to control the capacity of said collecting means, and said collecting means being disposed to overflow into said storage means.

3. Apparatus for tempering a mass having the characteristics of chocolate comprising in combination
means for applying the tempered mass,
collector means for receiving the unused tempered mass from said applying means,
storage means for receiving a portion of the tempered mass from said collector means,
heating means for said collector means and said storage means,
a heating cylinder connected to said storage means, a cooling cylinder connected to said heating cylinder, and a mixing and reheating cylinder connected to said cooling cylinder,
heating means for said cylinders,
cooling means for said cooling cylinder and said mixing and reheating cylinder,
conduit means for feeding tempered mass from said storage means to said heating cylinder,
screw conveyor means in said cylinders for feeding tempered mass through said cylinders,
conduit means for feeding tempered mass from said collector means to said screw conveyor means between said cooling cylinder and said mixing and reheating cylinder,
and pump means mounted at the end of said mixing and reheating cylinder for feeding the mass to said application means,
said apparatus including a heating jacket having spaced double walls enclosing said storage means and said cylinders,
first pipe means for feeding a heating fluid from said heating jacket of said storage means to said heating jackets of said cylinders,
second pipe means for feeding the heating fluid from said heating jackets of said cylinders to said heating jacket of said storage means,
heating means in said second pipe means for heating said fluid,
and fluid temperature sensing means extending into said second pipe means downstream of said heating means and connected thereto for controlling the temperature of said heating fluid, said collecting means being disposed within said storage means,
that a portion of said heating jacket of said storage means encloses said collecting means,
that a pipe means connects said portion of said heating jacket to the remaining portion of said heating jacket,
and that a valve means is mounted in said last named pipe means to adjust the amount of heating fluid circulated through said jacket portion.

References Cited

UNITED STATES PATENTS 2,963,367   12/1960   Sollich _____ 99—23

LIONEL M. SHAPIRO, *Primary Examiner.*

HYMAN LORD, *Examiner.*

D. M. NAFF, *Assistant Examiner.*